UNITED STATES PATENT OFFICE.

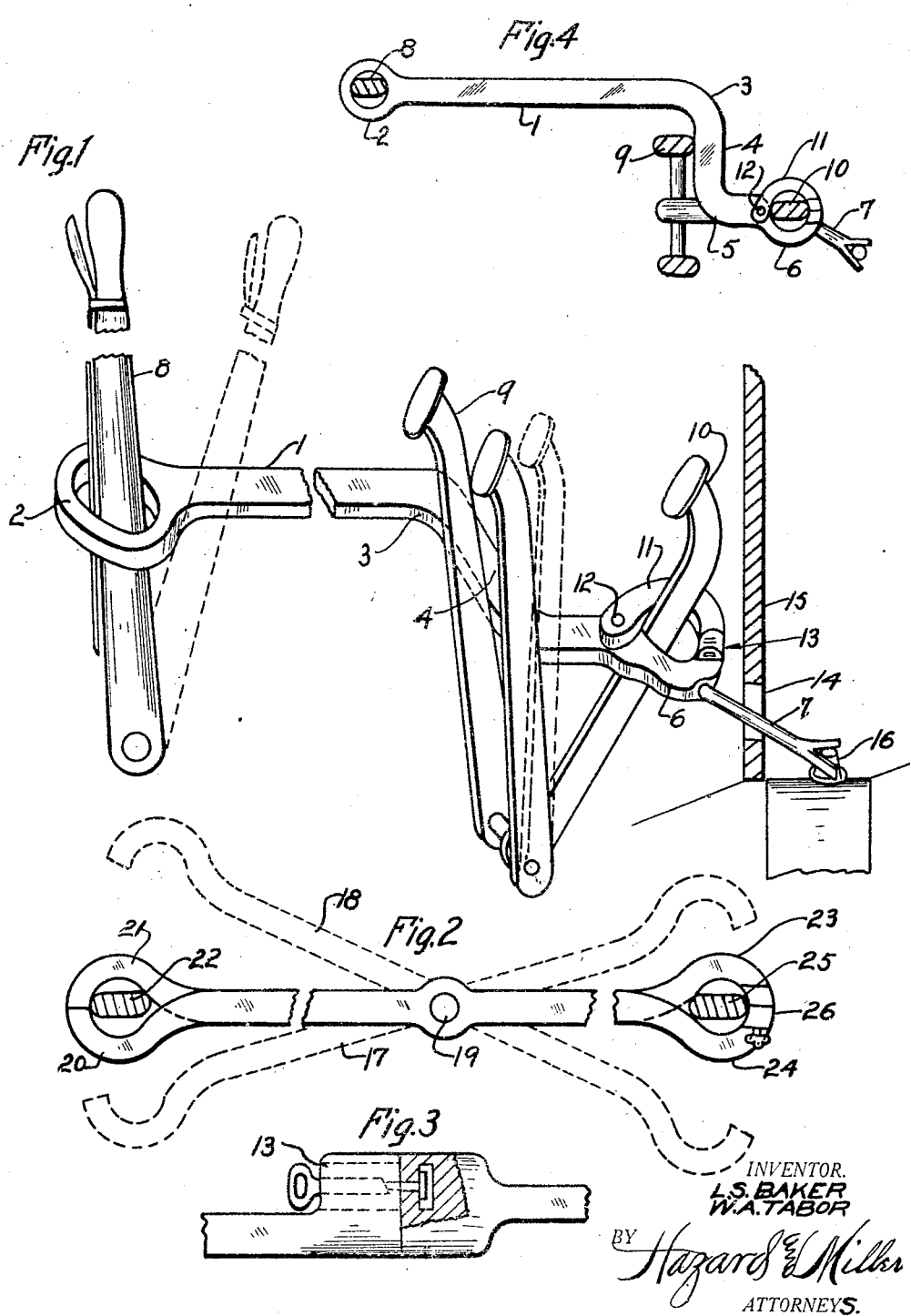

LITTLETON S. BAKER AND WILLIAM A. TABOR, OF PASADENA, CALIFORNIA.

AUTOMOBILE-LOCK.

1,364,539.     Specification of Letters Patent.     Patented Jan. 4, 1921.

Application filed July 17, 1919. Serial No. 311,610.

*To all whom it may concern:*

Be it known that we, LITTLETON S. BAKER and WILLIAM A. TABOR, citizens of the United States, residing at Pasadena, in the county of Los Angeles and State of California, have invented new and useful Improvements in Automobile-Locks, of which the following is a specification.

Our invention relates to automobile locks, and our invention consists of the novel features herein shown, described and claimed.

Specifically one object of our invention is to provide a lock which will hold the emergency brake set and the transmission gear in reverse and ground the electric circuit all in one device.

Another object of our invention is to make a single lock which will connect two levers together and hold a vehicle inoperative.

Figure 1 is a fragmentary perspective showing an automobile lock embodying the principles of our invention as applied to the operating levers of a Ford automobile.

Fig. 2 shows a modified construction adapted for connecting two operating levers together to hold the vehicle inoperative.

Fig. 3 is a fragmentary sectional detail of the key lock mechanism.

Fig. 4 is a diagrammatic plan of the lock shown in Fig. 1.

The main body of the lock shown in Figs. 1 and 4 comprises a straight portion 1, an eye 2 at one end of the straight portion 1, a bend 3 at the other end of the straight portion 1, a straight portion 4 extending from the bend 3 at right angles to the portion 1, a bend 5 at the opposite end of the straight portion 4 from the bend 3, a jaw 6 at the opposite end of the bend 5 from the straight portion 4, and a fork 7 extending from the jaw 6.

The eye 2 is adapted to fit downwardly around the emergency brake lever 8. The straight portion 4 is adapted to pass in front of the clutch lever 9, and the jaw 6 is adapted to fit around one side of the reverse lever 10.

The straight portion 1 is long enough to hold the emergency brake lever 8 in position to set the brake and hold the reverse lever 10 in position to throw the transmission gear into reversing position, so that the levers cannot be manipulated to operate the vehicle.

The second jaw 11 is connected to the head of the jaw 6 by a pivot pin 12, and the jaw 11 fits around the other side of the lever 10 and the points of the jaws are connected by a key lock construction 13, so that the lock cannot be removed and the levers operated by an unauthorized person.

The fork 7 extends through an opening 14 in the dash board 15 and engages the magneto contact binding post 16 so as to ground the electric circuit and render the magneto inoperative.

In the modification shown in Fig. 2, the mating bars 17 and 18 are crossed and connected at their centers by a pivot pin 19 like a pair of shears. The bars 17 and 18 have mating hooks 20 and 21 at one end adapted to embrace a lever 22, and the levers 17 and 18 have mating hooks 23 and 24 at the other end adapted to embrace the lever 25, and a key lock mechanism 26 connects the hooks 23 and 24 together so as to connect the levers 22 and 25 together and render the levers inoperative to operate the vehicle.

Various changes may be made without departing from the spirit of our invention as claimed.

We claim:

1. An automobile lock including a body, an eye at one end of said body, a jaw on the other end of said body, a fork rigidly fixed to and extending outwardly at an angle from said jaw, a second jaw pivoted to said first jaw and a lock for locking said jaws together.

2. An automobile lock comprising a body having a straight portion, an eye at one end of the straight portion, a bend at the other end of the straight portion, a second straight portion extending from the bend, a second bend at the other end of the second straight portion, a jaw extending from the second bend, a fork extending from the jaw, a second jaw pivoted to the first jaw, and a key lock mechanism connecting the points of the two jaws.

In testimony whereof we have signed our names to this specification.

LITTLETON S. BAKER.
WILLIAM A. TABOR.